United States Patent
Yamamoto et al.

(10) Patent No.: US 6,639,207 B2
(45) Date of Patent: Oct. 28, 2003

(54) OPTICAL ROTARY ENCODER AND MOTOR CONTROL APPARATUS

(75) Inventors: Shinji Yamamoto, Yokohama (JP); Masahiko Igaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/749,817

(22) Filed: Dec. 28, 2000

(65) Prior Publication Data
US 2001/0013765 A1 Aug. 16, 2001

(30) Foreign Application Priority Data

Dec. 28, 1999 (JP) ............................................ 11/375212

(51) Int. Cl.⁷ ................................................ G01D 5/34
(52) U.S. Cl. .............................. 250/231.14; 250/231.13
(58) Field of Search ........................... 250/231.14, 232, 250/233, 230, 231.16, 231.18, 231.17; 341/13

(56) References Cited

U.S. PATENT DOCUMENTS

| | | | | |
|---|---|---|---|---|
| 4,990,767 A | * | 2/1991 | Ernst et al. ............. | 250/231.16 |
| 5,038,031 A | * | 8/1991 | Kurosawa et al. ...... | 250/231.14 |
| 5,359,193 A | | 10/1994 | Nyui et al. | |
| 5,481,106 A | | 1/1996 | Nyui et al. | |
| 5,483,059 A | | 1/1996 | Igaki et al. | |
| 6,215,119 B1 | * | 4/2001 | Markham et al. ...... | 250/231.14 |

FOREIGN PATENT DOCUMENTS

JP 7-140844 6/1995

* cited by examiner

Primary Examiner—Robert H. Kim
Assistant Examiner—Hoon Song
(74) Attorney, Agent, or Firm—Fitzpatrick, Cella, Harper & Scinto

(57) ABSTRACT

A rotary encoder includes a disk-shaped scale and sensors, each including a light emitting part and a light detecting part, for outputting an electrical signal. A light beam is emitted from the light emitting part so as to illuminate the scale with the emitted light beam and a light beam reflected from the scale is incident on the light detecting part, thereby generating an electrical signal corresponding to the amount of light incident upon the light detecting part. A plurality of sensors is disposed on an outer periphery of the scale such that when the orientation of each sensor is defined by the direction from the light emitting part to the light detecting part of each sensor, the respective sensors are oriented in a circumferential direction of the scale and such that the locations of the plurality of sensors are substantially point-symmetric about the center of the scale, whereby errors due to the eccentricity, the inclination, and the surface fluctuation of the scale are compensated for, thereby precisely detecting the driving state of an object being driven.

13 Claims, 10 Drawing Sheets

OPTICAL ROTARY ENCODER AND MOTOR CONTROL APPARATUS

BACKGROUND OF THE INVENTION

1. Field of the Invention

The present invention relates to an optical rotary encoder and a motor control apparatus for detecting and controlling the rotation of a rotating member such as a photoconductor drum of an electrophotographic copying machine or a paper feed roller of a printer.

2. Description of the Related Art

Conventionally, in apparatus in which a rotating member is driven by a motor, a magnetic or an optical rotary encoder is employed to precisely control the rotational speed and the stopping position. In these apparatuses, a rotary scale is attached to the rotating shaft of a motor or to the rotating shaft of a rotating member coupled via a gear or a belt with the rotating shaft of the motor, thereby allowing the rotation condition of the rotary scale to be detected using a sensor. In the case of magnetic rotary encoders, a magnetoresistive device is used as the sensor. On the other hand, a sensor using a light emitting device and a light detecting device is employed for optical rotary encoders.

In applications in which very high precision control is required, as is the case with electrophotographic copying machines in which the rotation of a photoconductor drum is required to be very precisely controlled, it is known to use two sensors in a rotary encoder, as is disclosed, for example, in Japanese Patent Laid-Open No. 7-140844, such that the two sensors are disposed at opposite locations about the rotation center whereby the rotation is controlled on the basis of the mean value of information output from the two sensors. Even when the rotary scale is eccentrically located with respect to the rotation center, the above technique makes it possible to achieve high precision control by compensating for an error due to the eccentricity.

However, in the conventional technique disclosed in Japanese Patent Laid-Open No. 7-140844, although the error can be substantially compensated for when the optical rotary encoder is of the transmissive type, further problems can occur when an optical rotary encoder of the reflective type is used. That is, in the optical rotary encoders of the reflective type, in addition to the eccentricity of the rotary scale, the inclination of the rotary scale with respect to the rotational axis and the vibrating fluctuations of the position of the surface of the slit plate of the rotary scale result in errors which cannot be eliminated by conventional techniques.

SUMMARY OF THE INVENTION

In view of the above-described problems, it is an object of the present invention to provide an optical rotary encoder and a motor control apparatus capable of precisely detecting the driving state of a rotating member by compensating for errors due to eccentricity and inclination of an attached scale and an error due to fluctuations of the surface of the scale.

According to an aspect of the present invention, to achieve the above object, there is provided an optical rotary encoder comprising: a scale, in the form of a circular disk, including reflecting and non-reflecting parts disposed alternately along the circumference of the circular disk, and sensors, each including a light emitting part and a light detecting part, for outputting an electrical signal, wherein a light beam is emitted from the light emitting part so as to illuminate the scale with the emitted light beam and a light beam reflected from the scale is incident on the light detecting part, thereby generating an electrical signal corresponding to the amount of light incident upon the light detecting part. In this aspect of the invention, two sensors are disposed on an outer periphery of the scale such that when the orientation of each sensor is defined by the direction from the light emitting part to the light detecting part of each sensor, the two sensors are oriented in a circumferential direction of the scale and such that the locations of the two sensors are substantially point-symmetric about the center of the scale.

According to another aspect of the present invention, there is provided an optical rotary encoder comprising: a scale, in the form of a circular disk, including reflecting and non-reflecting parts disposed alternately along the circumference of the circular disk, and sensors, each including a light emitting part and a light detecting part, for outputting an electrical signal, wherein a light beam is emitted from the light emitting part so as to illuminate the scale with the emitted light beam and a light beam reflected from the scale is incident on the light detecting part, thereby generating an electrical signal corresponding to the amount of light incident upon the light detecting part. In this aspect of the invention, a plurality of sensors is disposed on the outer periphery of the scale such that when the orientation of each sensor is defined by the direction from the light emitting part to the light detecting part of each sensor, the respective sensors are oriented in a circumferential direction of the scale and such that the plurality of sensors is located at substantially equal intervals along the circumference of the scale.

Further objects, features and advantages of the present invention will become apparent from the following description of the preferred embodiments with reference to the attached drawings.

DESCRIPTION OF THE PREFERRED EMBODIMENTS

The present invention is described in further detail below with reference to preferred embodiments in conjunction with the accompanying drawings.

Figure 1:
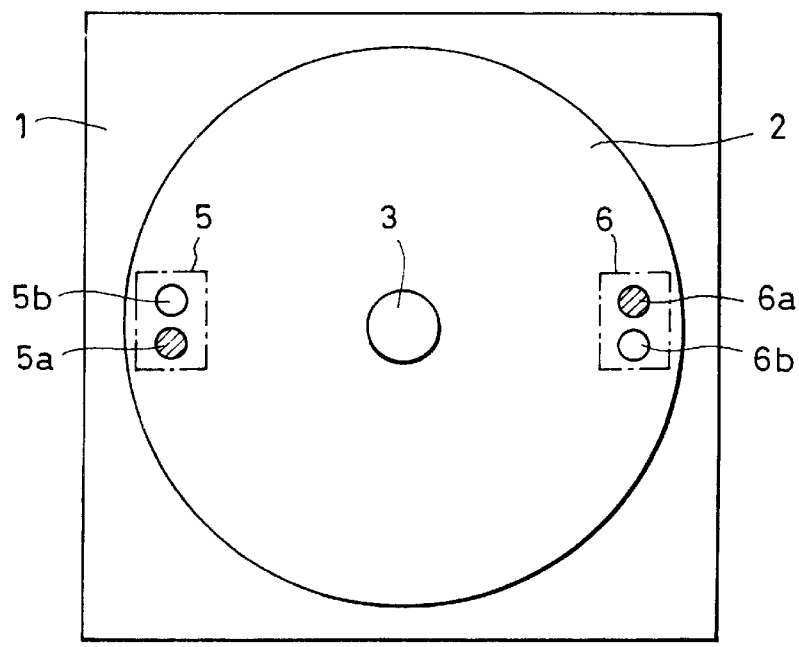
FIG. 1 is a plan view of a motor apparatus according to a first embodiment of the present invention.
Figure 2:
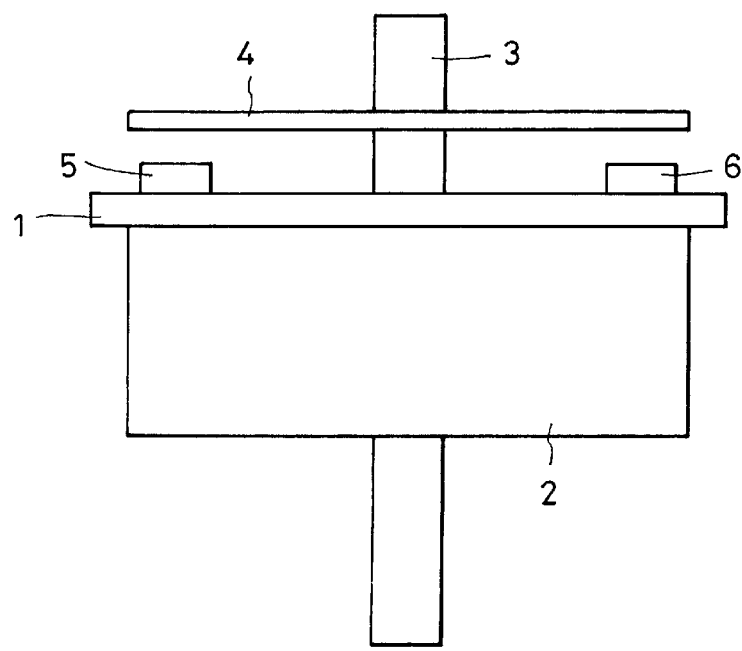
FIG. 2 is a front view of the motor apparatus according to the first embodiment of the present invention.

FIG. 1 is a plan view of a first embodiment of a motor control apparatus, and FIG. 2 is a front view thereof. A rotary encoder for detecting rotation information is disposed on an ultrasonic motor 2, and the motor is controlled on the basis of a signal output from the rotary encoder. A printed circuit board 1, on which parts of the rotary encoder such as a sensor, circuit elements and connectors are mounted, is firmly disposed on the housing of the ultrasonic motor 2. The ultrasonic motor 2 is capable of generating a relatively large torque at low rotational speeds, and thus can be advantageously used in applications in which high-precision direct driving is required.

Figure 3A:
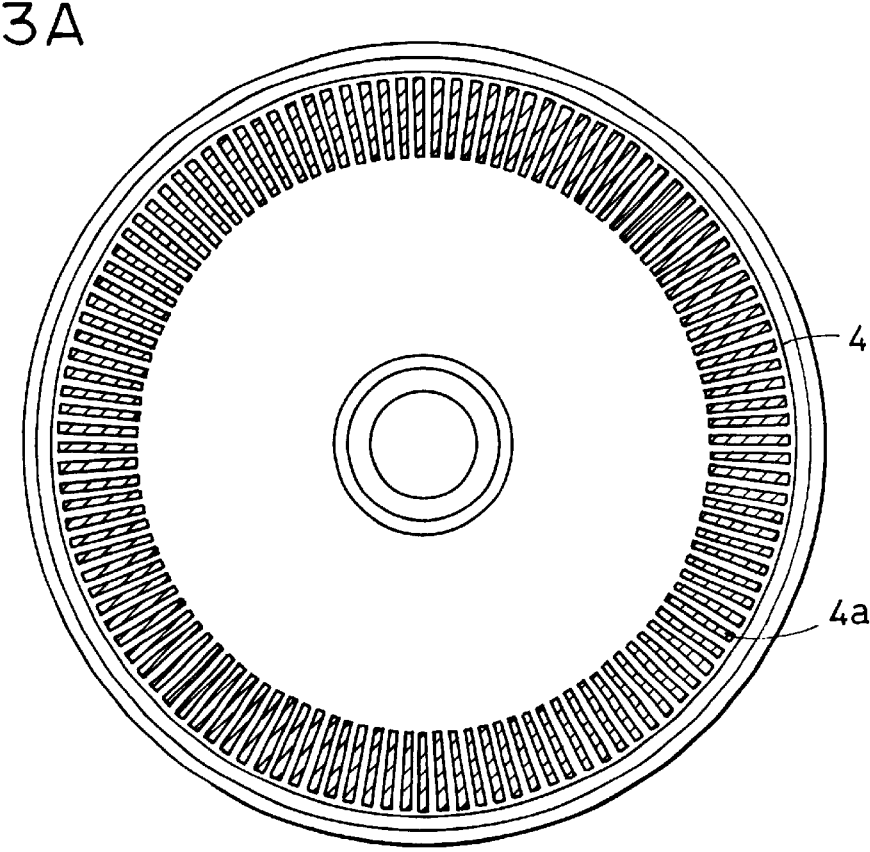
FIG. 3A is a plan view of a code wheel and FIG. 3B is a partial enlarged view of the code wheel.
Figure 3B:
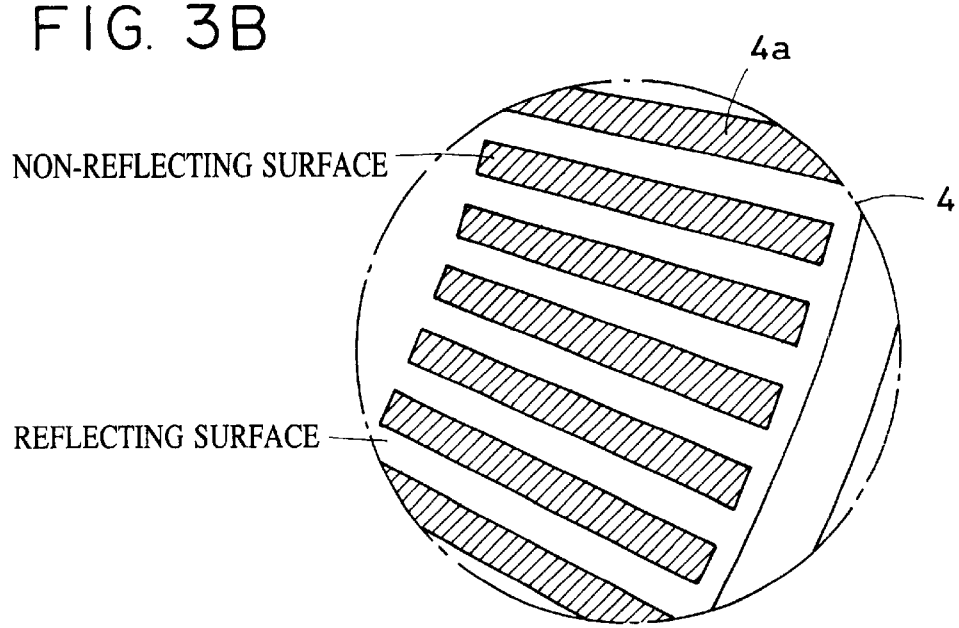

As shown in FIG. 2, a code wheel 4 serving as a rotary scale is fixed to the shaft 3 of the motor 2, at a location above the printed circuit board 1, such that the code wheel 4 rotates as the shaft 3 rotates when the motor 2 is driven. On the back side of the code wheel 4, as shown in FIG. 3A, a radial slit pattern 4a is formed on a circular disk member. The slit pattern 4a includes portions with a non-reflecting surface represented by shaded areas in FIG. 3A and portions with a reflecting surface represented by non-shaded areas. When light emitted by a light emitting device falls upon the surface of a reflecting portion, the light is reflected by the reflecting surface and the reflected light is incident upon a light detecting device. FIG. 3B is a partial enlarged view of the code wheel 4.

Figure 4:
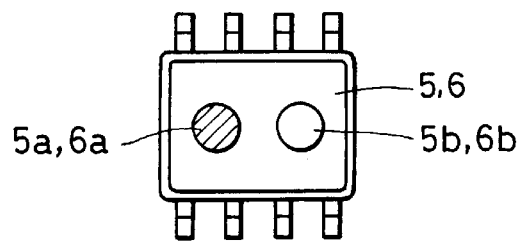
FIG. 4 is plan view of a sensor.

FIG. 2 shows sensors 5 and 6 in the form of an IC chip, such as that shown in more detail in FIG. 4, produced by means of a semiconductor manufacturing process, each including a light emitting device 5a or 6a and a light detecting device 5b or 6b, respectively, which are directly soldered to the printed circuit board 1, at peripheral locations symmetric about the shaft 3.

Figure 5:
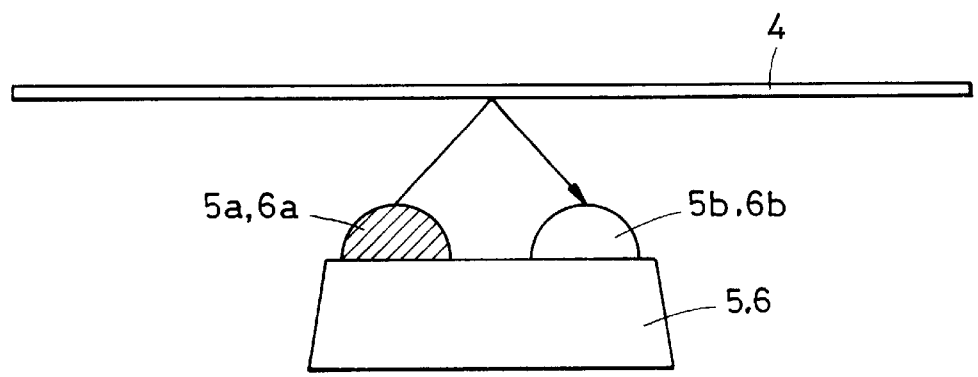
FIG. 5 is a side view of a reflective encoder.

FIG. 5 is a side view illustrating the detecting principle of the rotary encoder. The light emitting devices 5a and 6a of the respective sensors 5 and 6 emit light using an LED serving as a light source and output the emitted light to the outside via a lens. On the other hand, the light detecting devices 5b and 6b each includes a photodiode capable of generating a photocurrent depending upon the amount of light incident via a lens.

In the present embodiment constructed in the above-described manner, when the light output from the light emitting devices 5a and 6a strikes the code wheel 4, if the illuminated point is on the reflective surface of the code wheel 4, the light is reflected and incident upon the light detecting devices 5b and 6b as represented by the arrow shown in FIG. 5. When the light falls upon the non-reflecting surface, no light is incident upon the light detecting devices 5b and 6b. In the case in which light is incident upon the light detecting device 5b or 6b, a current flowing through the photodiode is converted to a voltage by a circuit disposed in each sensor 5 or 6 and further converted to a digital signal by a comparator disposed in each sensor 5 or 6. When the code wheel 4 is rotating, the resultant generated digital signal is of the form of a pulse signal whose frequency is proportional to the rotational speed of the code wheel 4.

Figure 6:
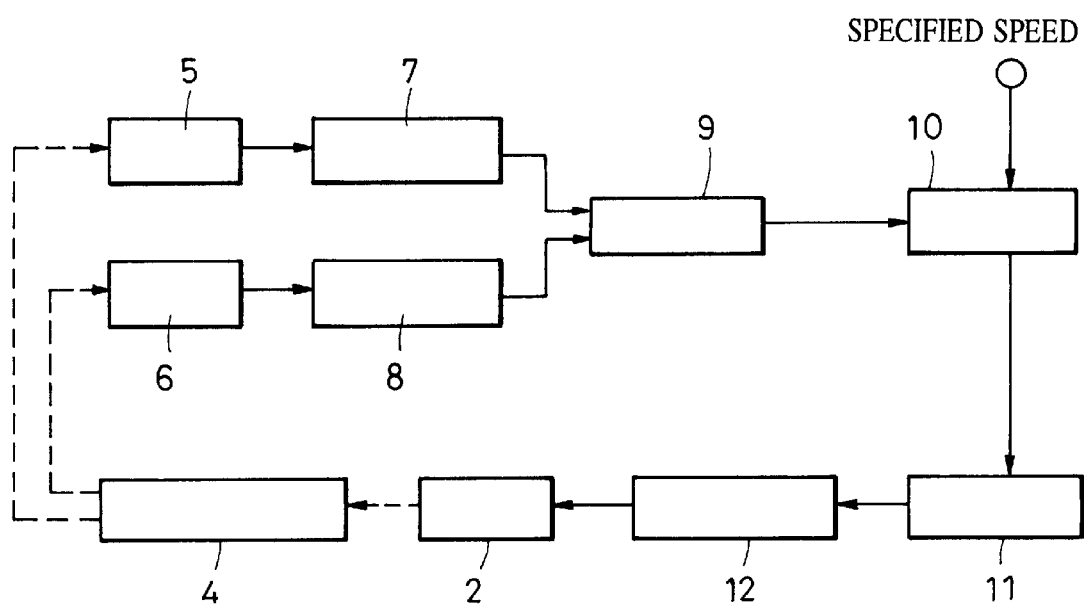
FIG. 6 is a block diagram illustrating the configuration of a motor control circuit.

FIG. 6 is a block diagram illustrating a circuit for controlling the motor. In FIG. 6, solid lines extending between blocks represent electrical connections and broken lines represent mechanical coupling. The outputs of the sensors 5 and 6 are applied to a mean value calculator 9 via respective speed detectors 7 and 8. The output of the mean value calculator 9 is input to a speed comparator 10, wherein a value specifying a target speed is also input to the speed comparator 10. The output of the speed comparator 10 is input to a PI calculator 11 including a CPU. The output of the PI calculator 11 is then input to a driver circuit 12 including a frequency signal generator and a voltage step-up circuit. The output of the driver circuit 12 is applied to the ultrasonic motor 2.

In the motor control circuit configured in the above-described manner, the rotational speed of the motor 2 is detected by measuring the frequency or the period of the digital pulse signal generated by the sensors 5 and 6 in response to the rotation of the code wheel 4. The speed information output from the speed detector 7 and that from the speed detector 8 are added together and then divided by two by the mean value calculator 9, thereby determining the mean value thereof. The output from the mean value calculator 9 is employed as information representing the rotational speed of the motor 2. The speed comparator 10 compares the current speed received from the mean value calculator 9 with the specified target speed input from the outside. The comparison result indicating the deviation is output from the speed comparator 10.

In accordance with the deviation information output from the speed comparator 10, the PI calculator 11 performs proportional-plus-integral calculation to determine the control amount of the ultrasonic motor 2. More specifically, the sum of the products of the respective deviation information and the proportional gain is added with the sum of the products of the integral of the deviation information and the integral gain, and the control amount is determined on the basis of the above calculation result. The driving speed of the motor 2 can be varied by adjusting the amplitude of the applied voltage or the driving frequency. In this specific embodiment, the driving frequency is adjusted to control the driving speed of the motor 2.

Figure 7:
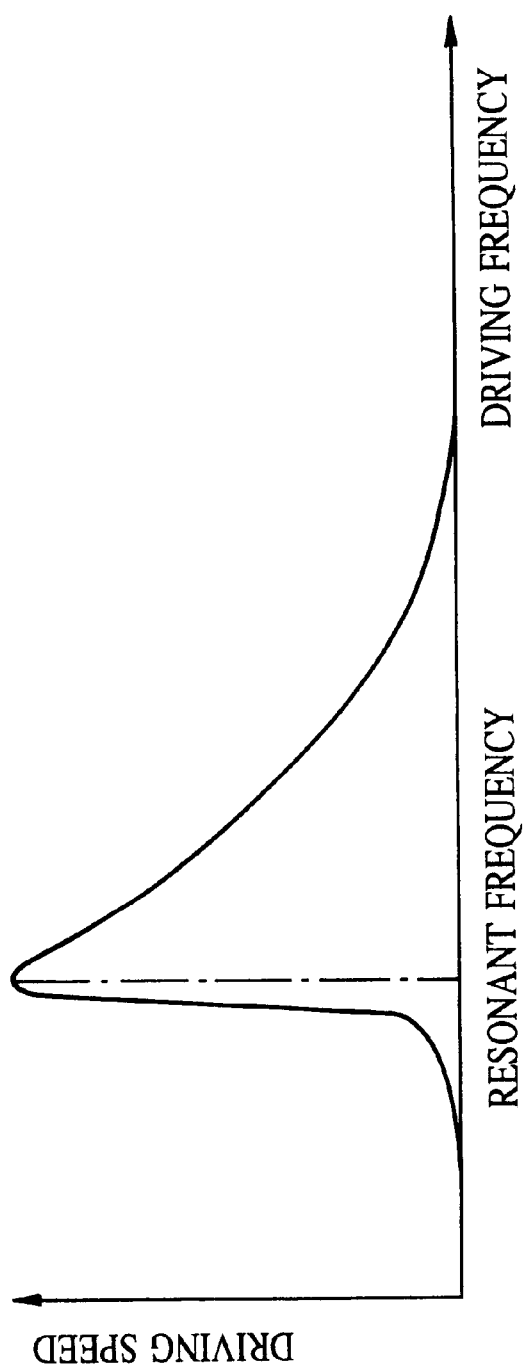
FIG. 7 is a graph illustrating the characteristic curve of an ultrasonic motor.

As shown in FIG. 7, when the driving speed is plotted as a function of the driving frequency, the driving speed has a maximum value at a resonant frequency, and it decreases rather gradually in the higher frequency range and abruptly in the lower frequency range. In the present embodiment, the ultrasonic motor 2 is controlled within the frequency range higher than the resonant frequency so as to achieve better controllability. Therefore, the speed decreases with the frequency and the control gain becomes negative. The driver circuit 12 generates a signal for driving the motor 2, on the basis of the value specifying the frequency determined as the control amount by the PI calculator 11.

Figure 8:
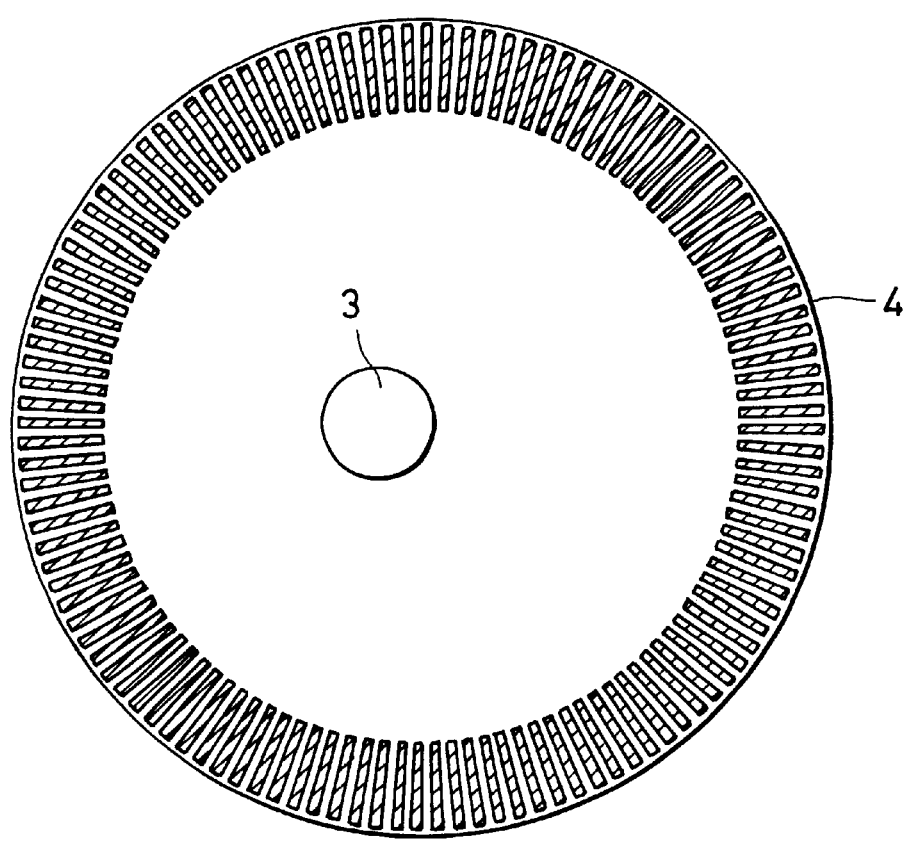
FIG. 8 is a plan view of an eccentric code wheel.

In the motor apparatus constructed in the above-described manner, when there is an eccentric deviation of the code wheel 4 attached to the shaft 3 as shown in FIG. 8, for example, the error due to the eccentricity can be compensated for by simply averaging the outputs of the sensors 5 and 6 disposed at locations symmetric about the shaft as is disclosed in Japanese Patent Laid-Open No. 7-140844. However, when a reflective encoder is used, as in the present embodiment, in addition to the error due to the eccentricity, it is also necessary to take into account the inclination, such as that shown in FIG. 9, of the code wheel 4 with respect to the shaft 3.

Figure 10:
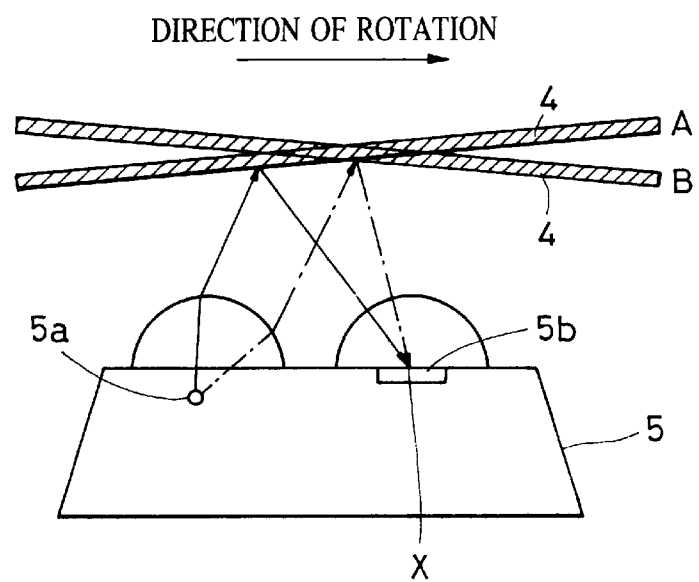
FIG. 10 is a side view illustrating the inclination of the reflecting plane of a code wheel.

FIG. 10 illustrates the optical path from the light emitting device 5a to a point X on the light detecting device 5b, for the cases in which light reflected from portions A and B of the inclined code wheel 4 are detected by the sensor 5. As can be seen, when light reflected from the portion A of the code wheel 4, whose vertical position becomes higher with the horizontal position in the left-to-right direction, is detected, light travels from the light emitting device 5a to the light detecting device 5b along the optical path represented by the solid line. On the other hand, when light reflected from the portion B of the code wheel 4, whose vertical position becomes lower with the horizontal position in the left-to-right direction, is detected, light travels along the optical path represented by the broken line. Therefore, when detection is performed along the optical path represented by the broken line, the illuminated point on the code wheel 4 is shifted in the same direction as the direction of rotation represented by the arrow shown in FIG. 10, compared with the point illuminated when light travels along the optical path represented by the solid line. As a result, when the status is changed from that represented by the solid line to that represented by the broken line, the detected rotational speed becomes lower than the actual rotational speed.

Figure 11:
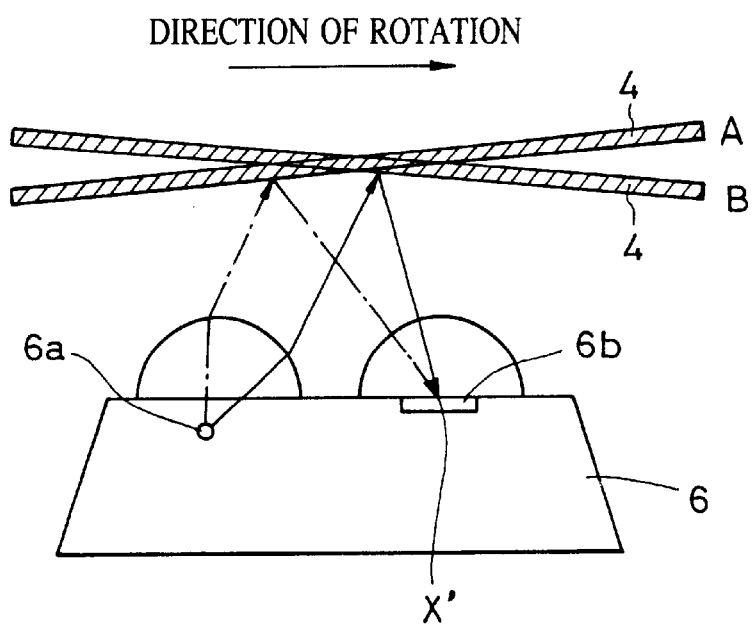
FIG. 11 is a side view illustrating the inclination of the reflecting plane of a code wheel.

FIG. 11 illustrates the optical path from the light emitting device 6a of the sensor 6 to point X' on the light detecting device 6b. When the sensor 5 is detecting light reflected from the portion A of the code wheel 4 whose vertical position becomes higher with the horizontal position in the left-to-right direction, the sensor 6 is detecting light reflected from the portion B whose vertical position becomes lower with the horizontal position in the left-to-right direction. On the other hand, when the sensor 5 is detecting light reflected from the portion B of the code wheel 4, the sensor 6 is detecting light reflected from the portion A. Therefore, when the sensor 5 is detecting light traveling along the optical path represented by the solid line in FIG. 10, the sensor 6 is detecting light traveling along the optical path represented by the solid line in FIG. 11. On the other hand, when the sensor 5 is detecting light traveling along the optical path represented by the broken line in FIG. 10, the sensor 6 is detecting light traveling along the optical path represented by the broken line in FIG. 11.

Therefore, when detection is performed along the optical path represented by the broken line, the illuminated point on the code wheel 4 is shifted in the direction opposite to the direction of rotation of the code wheel 4, compared with the point illuminated when light travels along the optical path represented by the solid line. As a result, when the status is changed from that represented by the solid line to that represented by the broken line, the detected rotational speed becomes higher than the actual rotational speed. Thus, the sensor 6 has a detection error opposite to that of the sensor 5. Therefore, if the detection results of the sensors 5 and 6 are averaged, the error due to the variation in the angle of the reflecting surface is eliminated, although there can be other errors due to the inclination of the code wheel 4.

Thus, the influence of the inclination of the code wheel 4 can be reduced. However, the inclination of the code wheel 4 results not only in a variation in the angle of the reflecting surface but also in a variation in the distance between the code wheel 4 and the sensors 5 and 6. The influence of the variation in the distance should also be taken into account.

Figure 12:
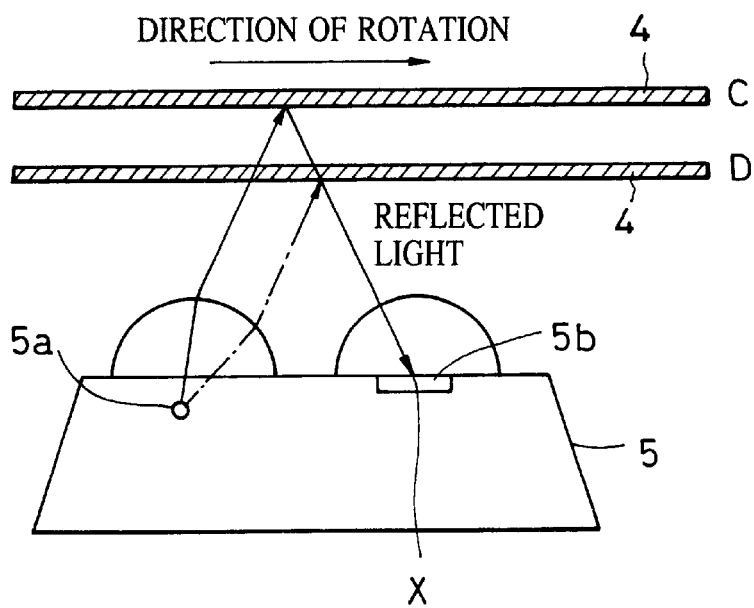
FIG. 12 is a side view illustrating the variation in the distance between a code wheel and a sensor.

FIG. 12 illustrates the variation in the optical path of the sensor 5 with the variation in the distance between the code wheel 4 and the sensor 5. When the sensor 5 detects light reflected from a portion C shown in FIG. 9, the distance between the sensor 5 and the code wheel 4 has a maximum value. In this case, light strikes the point X of the light detecting device 5b after traveling along the optical path represented by the solid line in FIG. 12. When the sensor 5 detects light reflected from a portion D, the distance between the sensor 5 and the code wheel 4 becomes minimum. In this case, light strikes the point X of the light detecting device 5b after traveling along the optical path represented by the broken line in FIG. 12.

Figure 9:
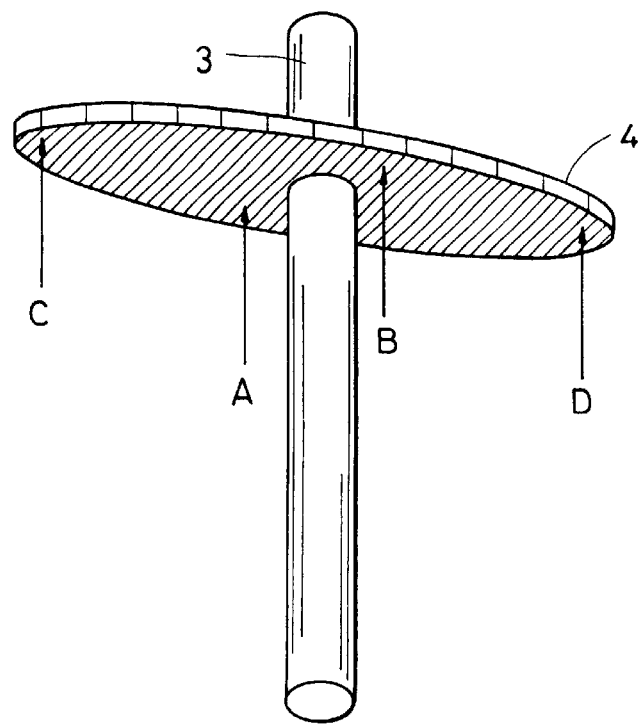
FIG. 9 is a front view of an inclined code wheel.

On the other hand, when the sensor 5 is detecting light reflected from the portion C shown in FIG. 9, the sensor 6 is detecting light reflected from the portion D shown in FIG. 9. Conversely, when the sensor 5 is detecting light reflected from the portion D shown in FIG. 9, the sensor 6 is detecting light reflected from the portion C shown in FIG. 9. Therefore, when the sensor 5 is detecting light traveling along the optical path represented by the solid line shown in FIG. 12, the sensor 6 is detecting light traveling along the optical path represented by the solid line shown in FIG. 13. Conversely, when the sensor 5 is detecting light traveling along the optical path represented by the broken line shown in FIG. 12, the sensor 6 is detecting light traveling along the optical path represented by the broken line shown in FIG. 13.

Figure 13:
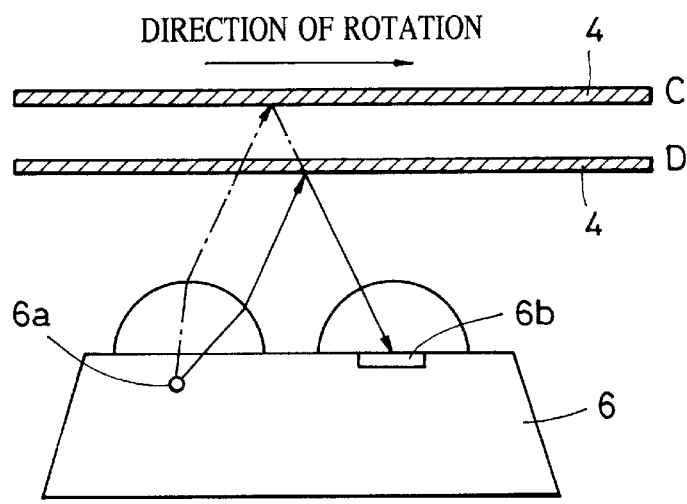
FIG. 13 is a side view illustrating the variation in the distance between a code wheel and a sensor.

As can be seen from a comparison between FIGS. 12 and 13, the relative positions of points on the code wheel 4 struck by light traveling along the optical paths represented by the solid line and the broken line are reversed between FIGS. 12 and 13. Therefore, by employing the mean value of speed information obtained from the sensors 5 and 6, it is possible to eliminate an error due to the variation in the distance between the code wheel 4 and the sensors 5 and 6.

Figure 14:
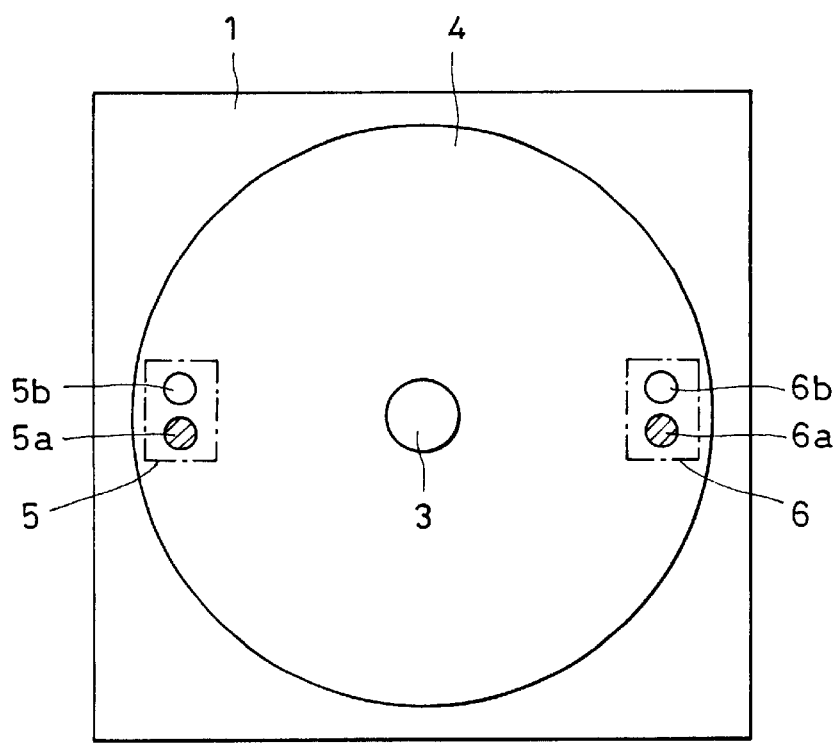
FIG. 14 is a plan view illustrating an example in which the influence of the distance variation cannot be eliminated.
Figure 15:
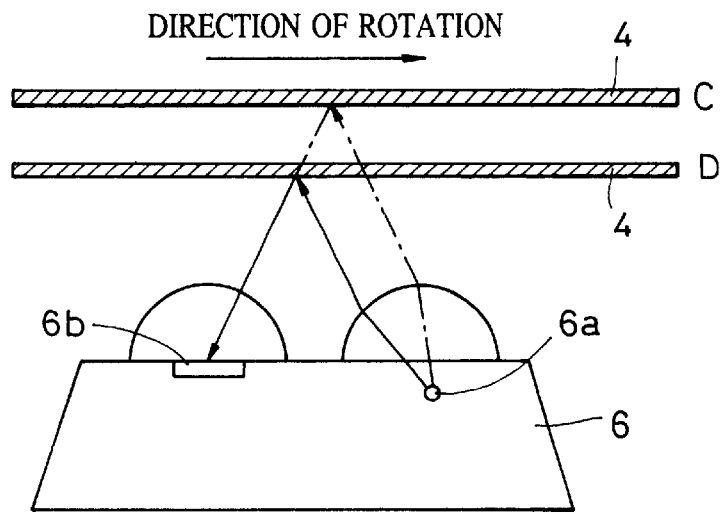
FIG. 15 is a side view illustrating the variation in the distance between a code wheel and a sensor.

In the example described above, the positions of the light emitting devices 5a and 6a of the sensors 5 and 6 are point-symmetrical about the rotation center, and the positions of the light detecting devices 5b and 6b are also point-symmetrical about the rotation center. In the case in which the positions are not point-symmetrical between the light emitting devices 5a and 6a of the sensors 5 and 6 and also between the light detecting devices 5b and 6b, as shown in FIG. 14, that is, in the case in which the sensors 5 and 6 are disposed in parallel at line-symmetrical locations, the optical paths of the sensors 5 and 6 become as shown in FIGS. 12 and 15, respectively. That is, when the sensor 5 is detecting light traveling along the optical path represented by the solid line shown in FIG. 12, the sensor 6 is detecting light traveling along the optical path represented by the solid line shown in FIG. 15. Conversely, when the sensor 5 is detecting light traveling along the optical path represented by the broken line shown in FIG. 12, the sensor 6 is detecting light traveling along the optical path represented by the broken line shown in FIG. 15.

With reference to FIGS. 12 and 15, it can be seen that the shift of the position of the illuminated point on the code wheel 4 from the solid-line optical path to the broken-line optical path occurs in the same direction as the direction of rotation of the code wheel 4 for both sensors 5 and 6. Therefore, in this case, the averaging of the speed information obtained from the sensors 5 and 6 does not result in elimination of the error. From the above discussion, it can be concluded that, in order to compensate for the error due to the variation in the distance between the code wheel 4 and the sensors 5 and 6, it is necessary to dispose the sensors 5 and 6 such that the locations of the light emitting devices 5a and 6a are point-symmetrical to each other about the rotation center and the locations of the light detecting devices 5b and 6b are also point-symmetrical to each other about the rotation center.

In the present embodiment, the operation of the motor 2 is controlled on the basis of the detected rotational speed of the motor 2. Alternatively, the period of the pulse output from the encoder may be measured and the operation of the motor 2 may be controlled such that the reciprocal of the rotational speed is maintained at a particular value. Still alternatively, the position may be controlled on the basis of the measured position.

Figure 16:
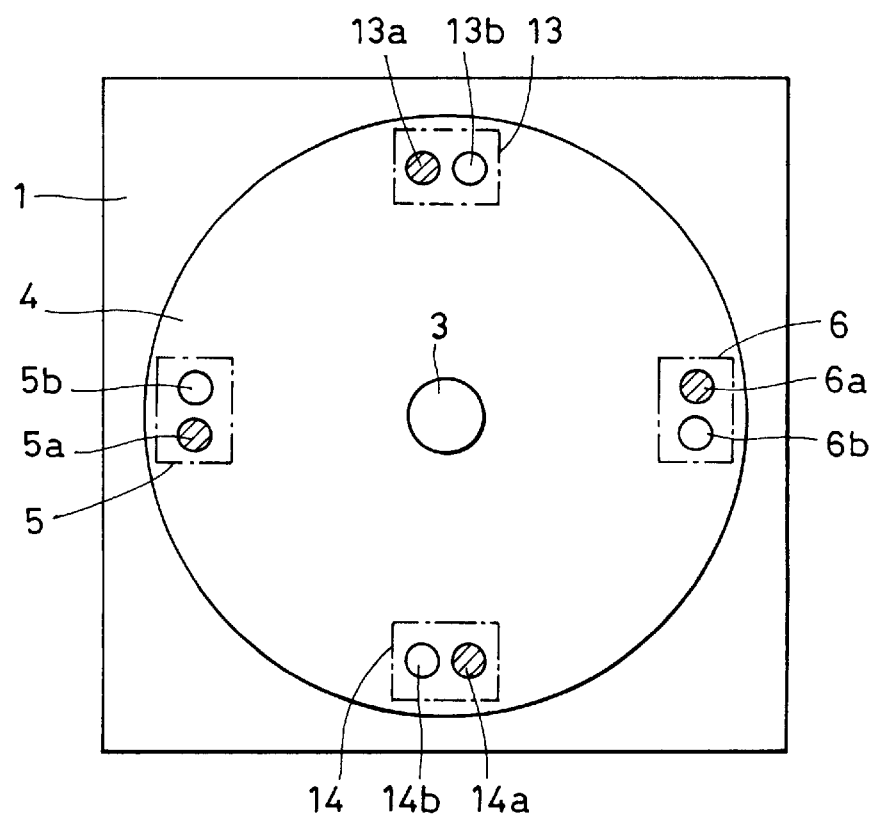
FIG. 16 is a plan view of a motor apparatus according to a second embodiment of the present invention.
Figure 17:
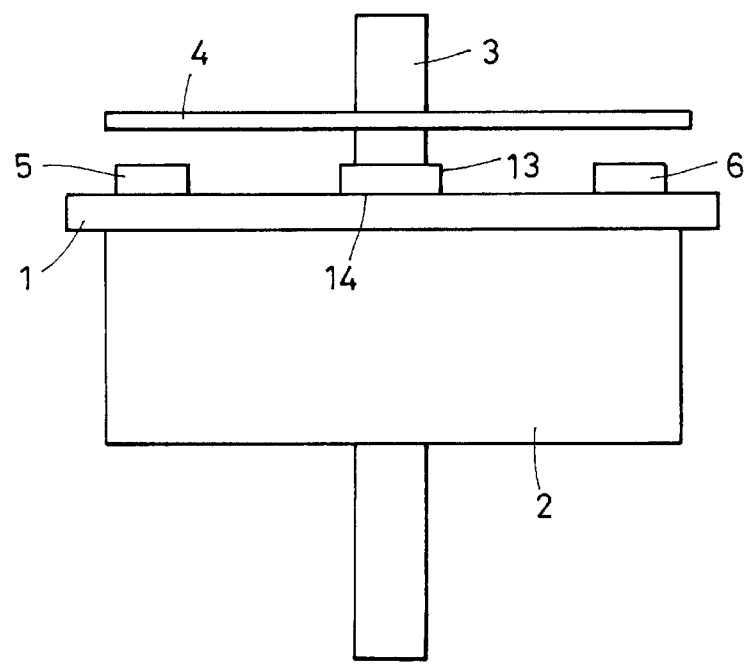
FIG. 17 is a front view of the motor apparatus according to the second embodiment of the present invention.
Figure 18:
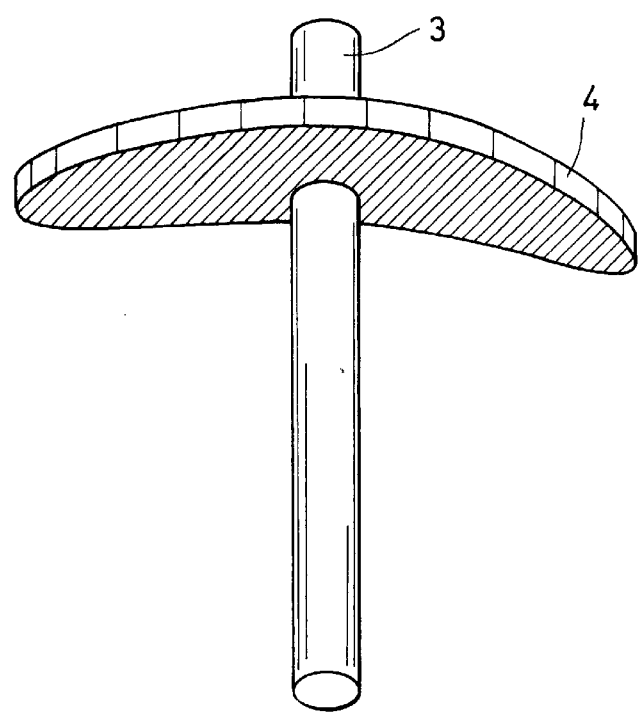
FIG. 18 is a front view of a code wheel bent in the same direction on opposite sides.

FIG. 16 is a plan view of a motor apparatus according to a second embodiment of the present invention, and FIG. 17 is a side view thereof. In this second embodiment, unlike the first embodiment in which two sensors are used, four sensors 5, 6, 13, and 14 are employed. When the code wheel 4 is bent in the same direction on opposite sides as shown in FIG. 18, the code wheel 4 will have inclinations in the same direction at opposite locations where the sensors 5 and 6 are disposed. Furthermore, in this case, the distance from the code wheel 4 becomes equal for both sensors 5 and 6. Therefore, the simple averaging of the speed signals obtained from the two sensors 5 and 6 employed in the first embodiment cannot result in elimination of the error due to the bending in the same direction.

In this second embodiment, the error due to the bending of the code wheel 4 in the same direction on the opposite sides is eliminated using the four sensors 5, 6, 13, and 14. The inclination of the code wheel bent in the same direction on opposite sides becomes reverse between locations where the sensors 5 and 13 are disposed and between locations where the sensors 6 and 14 are disposed. Furthermore, the variation in the distance from the code wheel 4 also becomes reverse between the locations where the sensors 5 and 13 are disposed and between locations where the sensors 6 and 14 are disposed. Thus, it is possible to eliminate the error due to the inclination of the code wheel 4 bent in the same direction on opposite sides, by averaging the signals output from the four sensors 5, 6, 13, and 14.

Furthermore, by disposing the sensors 5, 6, 13, and 14 such that when the orientation is defined by the direction from the light emitting device to the light detecting device of each sensor, all sensors are oriented in the same direction along the circumferential direction of the code wheel 4, as shown in FIG. 17, and it also becomes possible to eliminate the error due to the variation in the distance between the sensors 5, 6, 13, and 14 and the code wheel 4 bent in the same direction on the opposite side. Furthermore, errors due to the eccentricity and the simple inclination of the code wheel 4 are also eliminated as in the first embodiment.

In this second embodiment, the code wheel is assumed to be bent in the same direction on opposite sides. When the code wheel 4 has a higher-order deformation, a greater number of sensors may be disposed such that the error due to the higher-order deformation is eliminated by averaging the signals output from the respective sensors.

In the optical rotary encoder according to the present invention, as described above with reference to the specific embodiments, the error due to the inclination of the code wheel can be eliminated by employing two sensors disposed at opposite locations. By disposing the two sensors such that the locations of the light emitting devices of the two sensors are point-symmetric and such that the locations of the light detecting devices of the two sensors are also point-symmetric, the error due to the variation in the distance between the code wheel and the sensors is also eliminated.

Furthermore, even the error due to the inclination of the reflecting surface of the code wheel bent in the same direction on opposite sides can be eliminated by disposing a plurality of sensors at equal intervals. In this case, if the sensors are disposed such that the orientation defined by the direction from the light emitting device to the light detecting device becomes the same for all sensors with respect to the circumferential direction, the error due to the distance between the code wheel and the sensors is also eliminated.

Except as otherwise disclosed herein, the various components shown in outline or in block form in the Figures are individually well known and their internal construction and operation are not critical either to the making or using of this invention or to a description of the best mode of the invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical rotary encoder comprising:
    a scale, in the form of a circular disk, including a plurality of different reflective parts disposed alternately along the circumference of said circular disk; and
    sensors, each including a light emitting part and a light detecting part, for outputting an electrical signal, wherein a light beam is emitted from said light emitting part so as to illuminate said scale with the light beam and a light beam reflected from said scale is incident on said light detecting part, thereby generating an electrical signal corresponding to the amount of light incident upon said light detecting part,
    wherein said light emitting parts and light detecting parts of two of said sensors are disposed such that the light emitting part and the light detecting part of each sensor are disposed on the same surface at the same radial distance from the axis of rotation of said scale so that the direction from the light emitting part to the light detecting part is perpendicular to the radial direction when viewed along the axis of rotation and such that the locations of said light emitting parts of said two sensors are substantially point-symmetric about the axis of rotation of said scale, on the same side of the scale, and the locations of said light detecting parts of said two sensors are substantially point-symmetric about the axis of rotation of said scale, on the same side of the scale.

2. An optical rotary encoder comprising:
    a scale, in the form of a circular disk, including a plurality of different reflective parts disposed alternately along the circumference of said circular disk; and
    sensors, each including a light emitting part and a light detecting part, for outputting an electrical signal, wherein a light beam is emitted from said light emitting part so as to illuminate said scale with the light beam and a light beam reflected from said scale is incident on said light detecting part, thereby generating an electrical signal corresponding to the amount of light incident upon said light detecting part,
    wherein light emitting parts and light detecting parts of a plurality of said sensors are disposed such that the light emitting part and the light detecting part of each sensor are disposed on the same surface at the same radial distance from the axis of rotation of said scale so that the direction from the light emitting part to the light detecting part is perpendicular to the radial direction when viewed along the axis of rotation and such that said light emitting parts of said plurality of sensors are located at positions corresponding to substantially equal intervals along the circumference of said scale and said light detecting parts of said plurality of sensors are located at positions corresponding to substantially equal intervals along the circumference of said scale.

3. An optical rotary encoder according to claim 2, wherein said plurality of said sensors is disposed such that when the orientation of each sensor is defined by the direction, in a clockwise or counterclockwise sense, from the light emitting part to the light detecting part of each sensor, all sensors are oriented in the same direction.

4. A motor control apparatus including an optical rotary encoder according to claim 2, further comprising (i) a converter for converting the signals output from the respective sensors into information proportional to one of the position, the speed, and the reciprocal of the speed, (ii) an operation device for thereafter subjecting the information obtained from each sensor to an operation and (iii) a controller for controlling a motor in accordance with the result of the operation.

5. A motor control apparatus according to claim 4, further comprising a measurement device for measuring the period of the signal output from each sensor, wherein said converter converts the signals output from the respective sensors into the information by the measured period of the signal output from each sensor, said operation device thereafter subjects the information obtained as the measurement result to the operation, and said controller controls said motor in accordance with the result of the operation.

6. A motor control apparatus according to claim 4, further comprising a measurement device for measuring the number of cycles for a predetermined period of time of a signal output from each sensor, wherein said converter converts the signals output from the respective sensors into the information by the measured number of cycles for a predetermined period of time of a signal output from each sensor, said operation device thereafter subjects the information obtained as the measurement result to the operation, and said controller controls said motor in accordance with the result of the operation.

7. A motor control apparatus according to claim 4, further comprising a measurement device for measuring the number of cycles of a signal output from each sensor, wherein said converter converts the signal output from the respective sensors into the information by the measured number of cycles of the signal output from each sensor, said operation device thereafter subjects the information obtained as the measurement result to the operation, and said controller controls said motor in accordance with the result of the operation.

8. A motor control apparatus according to claim 4, wherein said operation device performs, as the operation, a calculation of the mean value of information obtained from at least two of said sensors.

9. A motor control apparatus according to claim 4, wherein said motor is a vibration type motor.

10. An optical rotary encoder comprising:
a scale, in the form of a circular disk, including a plurality of different reflective parts disposed alternately along the circumference of said circular disk; and
device pairs, each pair including a light emitting device and a light detecting device, for outputting an electrical signal, wherein a light beam is emitted from said light emitting device so as to illuminate said scale with the light beam and a light beam reflected from said scale is incident on said light detecting device, thereby generating an electrical signal corresponding to the amount of light incident upon said light detecting device,
wherein said light emitting devices and said light detecting devices of two of said device pairs are disposed such that the light emitting device and the light detecting device of each pair are disposed on the same surface at the same radial distance from the axis of rotation of said scale so that the direction from the light emitting device to the light detecting device is perpendicular to the radial direction when viewed along the axis of rotation and such that said light emitting device in one device pair and said light emitting device in another device pair are point-symmetric about the axis of rotation of said scale, on the same side of the scale, and said light detecting device in said one device pair and the light detecting device in said other device pair are point-symmetric about the axis of rotation of said scale, on the same side of the scale.

11. An optical rotary encoder according to claim 10, further comprising calculating means for calculating the rotational speed of said scale using a signal obtained from said light detecting device in said one device pair and the light detecting device in said other device pair.

12. An optical rotary encoder comprising:
a scale, in the form of a circular disk, including a plurality of different reflective parts disposed alternately along the circumference of said circular disk; and
device pairs, each including a light emitting device and a light detecting device, for outputting an electrical signal, wherein a light beam is emitted from said light emitting device so as to illuminate said scale with the light beam and a light beam reflected from said scale is incident on said light detecting device, thereby generating an electrical signal corresponding to the amount of light incident upon said light detecting device,
wherein said light emitting devices and said light detecting devices of a plurality of said device pairs are disposed such that the light emitting device and the light detecting device of each pair are disposed on the same surface at the same radial distance from the axis of rotation of said scale so that the direction from the light emitting device to the light detecting device is perpendicular to the radial direction when viewed along the axis of rotation and such that said light emitting devices of said plurality of device pairs are located at positions corresponding to substantially equal intervals along the circumference of said scale and said light detecting devices of said plurality of device pairs are located at positions corresponding to substantially equal intervals along the circumference of said scale.

13. An optical rotary encoder according to claim 12, further comprising calculating means for calculating the rotational speed of said scale using a signal obtained from said light detecting devices in said device pairs.

* * * * *